(12) United States Patent
Yoshii

(10) Patent No.: US 8,073,992 B2
(45) Date of Patent: Dec. 6, 2011

(54) DATA TRANSFER DEVICE AND DATA TRANSFER METHOD

(75) Inventor: Ryou Yoshii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 185 days.

(21) Appl. No.: 12/669,919

(22) PCT Filed: Jun. 23, 2008

(86) PCT No.: PCT/JP2008/001619
§ 371 (c)(1),
(2), (4) Date: Jan. 20, 2010

(87) PCT Pub. No.: WO2009/037798
PCT Pub. Date: Mar. 26, 2009

(65) Prior Publication Data
US 2010/0185790 A1    Jul. 22, 2010

(30) Foreign Application Priority Data

Sep. 21, 2007 (JP) ................................ 2007-245598

(51) Int. Cl.
*G06F 13/00* (2006.01)
*G06F 3/00* (2006.01)
*G06F 13/28* (2006.01)

(52) U.S. Cl. .................. 710/34; 710/18; 710/22; 710/35

(58) Field of Classification Search .................... 710/15, 710/18, 22, 34, 35
See application file for complete search history.

(56) References Cited

U.S. PATENT DOCUMENTS

| 5,014,186 | A | * | 5/1991 | Chisholm ........................ 710/30 |
| 5,809,552 | A | | 9/1998 | Kuroiwa et al. |
| 6,058,251 | A | | 5/2000 | Okamoto et al. |

(Continued)

FOREIGN PATENT DOCUMENTS

JP    58-184647 A    10/1983

(Continued)

*Primary Examiner* — Alford W. Kindred
*Assistant Examiner* — Farley Abad
(74) *Attorney, Agent, or Firm* — Birch, Stewart, Kolasch & Birch, LLP

(57) ABSTRACT

There are provided a transfer request module 2 for interpreting a data transfer request received from outside; a transfer instruction module 1 including a receiving section 10 for receiving the data transfer request after interpretation by the transfer request module 2, a remaining data setting section 12 for setting a data volume to be transferred in accordance with the data transfer request after the interpretation the receiving section 10 receives, a remaining data retaining section 16 for holding the data volume set by the remaining data setting section 12, a remaining data reading section 13 for reading the data volume held in the remaining data retaining section 16, a counter setting section 14 for setting a limit of the number of times of transfer unit settings in accordance with the data transfer request after the interpretation the receiving section 10 receives, a counter 17 for holding the limit of the number of times of the settings carried out by the counter setting section 14 and for counting down the value it holds every time the transfer unit is set, a counter reading section 15 for reading the value held in the counter 17, and a transfer instruction section 11 for instructing a controller module to transfer data in response to the data transfer request after the interpretation which is transmitted via the receiving section; and the controller module 3 for transferring the data in accordance with the instruction from the transfer instruction section 11.

2 Claims, 4 Drawing Sheets

U.S. PATENT DOCUMENTS 7,310,717 B2 * 12/2007 Nishino et al. .............. 711/165
2008/0109571 A1 * 5/2008 Lee et al. .................. 710/22

FOREIGN PATENT DOCUMENTS

| JP | 5-210621 A | 8/1993 |
| JP | 10-254817 A | 9/1998 |
| JP | 2000-132497 A | 5/2000 |
| JP | 2000-187636 A | 7/2000 |
| JP | 2001-344150 A | 12/2001 |
| JP | 2003-256355 A | 9/2003 |
| JP | 2003-281077 A | 10/2003 |
| JP | 3513291 B2 | 1/2004 |
| JP | 2007-4667 A | 1/2007 |

* cited by examiner

FIG. 3

|  | Step 1 | Step 2 | Step 3 | Step 4 | Step 5 |
|---|---|---|---|---|---|
| State | Initial Value Setting | Transfer Unit Setting | Transfer | Transfer | Transfer Unit Setting |
| Counter Value | 3 | 2 | 2 | 2 | 1 |
| Data Volume | 39 | 39 | 23 | 7 | 7 |
| Transfer Unit |  | 16 | 16 | 16 | 4 |

|  | Step 6 | Step 7 | Step 8 | Step 9 | Step 10 |
|---|---|---|---|---|---|
| State | Transfer | Transfer Unit Setting | Transfer | Transfer | Transfer |
| Counter Value | 1 | 0 | 0 | 0 | 0 |
| Data Volume | 3 | 3 | 2 | 1 | 0 |
| Transfer Unit | 4 | 1 | 1 | 1 | 1 |

DATA TRANSFER DEVICE AND DATA TRANSFER METHOD

TECHNICAL FIELD

The present invention relates to a data transfer device and a data transfer method for transferring data by a DMA (Direct Memory Access) method.

BACKGROUND ART

To achieve efficient data transfer by minimizing the number of times of the data transfer, a conventional data transfer device based on a DMA method sets the maximum transfer unit allowed from a plurality of predetermined transfer units according to a data volume to be transferred, and transfers the data at the transfer unit, followed by repeating, in accordance with the remaining data volume, the processing of setting the maximum transfer unit allowed and of transferring the data at the transfer unit until the data to be transferred is reduced to zero (see Patent Document 1, for example).

Patent Document 1: Japanese Patent Laid-Open No. 2000-187636.

With the foregoing configuration, the conventional data transfer device aims at only transferring data efficiently by minimizing the number of times of the transfer, but does not consider the number of times of the setting processing of the transfer unit. In addition, as for the transfer unit settings, since a CPU (Central Processing Unit) performs them, a greater number of times of the transfer unit settings at the data transfer offers a problem of increasing the load of the CPU by that amount.

The present invention is implemented to solve the foregoing problem. Therefore it is an object of the present invention to provide a data transfer device and data transfer method capable of reducing the load of the CPU at the data transfer by limiting the number of times of the transfer unit settings.

DISCLOSURE OF THE INVENTION

A data transfer device in accordance with the present invention is characterized by including a counter setting section for setting a limit of the number of times of data transfer unit settings, and a counter for holding the limit of the number of times of the settings carried out by the counter setting section, and for counting down the value it holds every time the transfer unit is set.

According to the present invention, since it includes the counter setting section for setting the limit of the number of times of the data transfer unit settings, and the counter for holding the limit of the number of times of the settings carried out by the counter setting section, and for counting down the value it holds every time the transfer unit is set, it offers an advantage of being able to reduce the load of a CPU by limiting the number of times of the transfer unit settings.

BRIEF DESCRIPTION OF THE DRAWINGS

FIG. 3 is a table showing the operation of the data transfer device of the embodiment 1.

BEST MODE FOR CARRYING OUT THE INVENTION

Embodiments in accordance with the invention will now be described with reference to the accompanying drawings.

Embodiment 1

Figure 1:
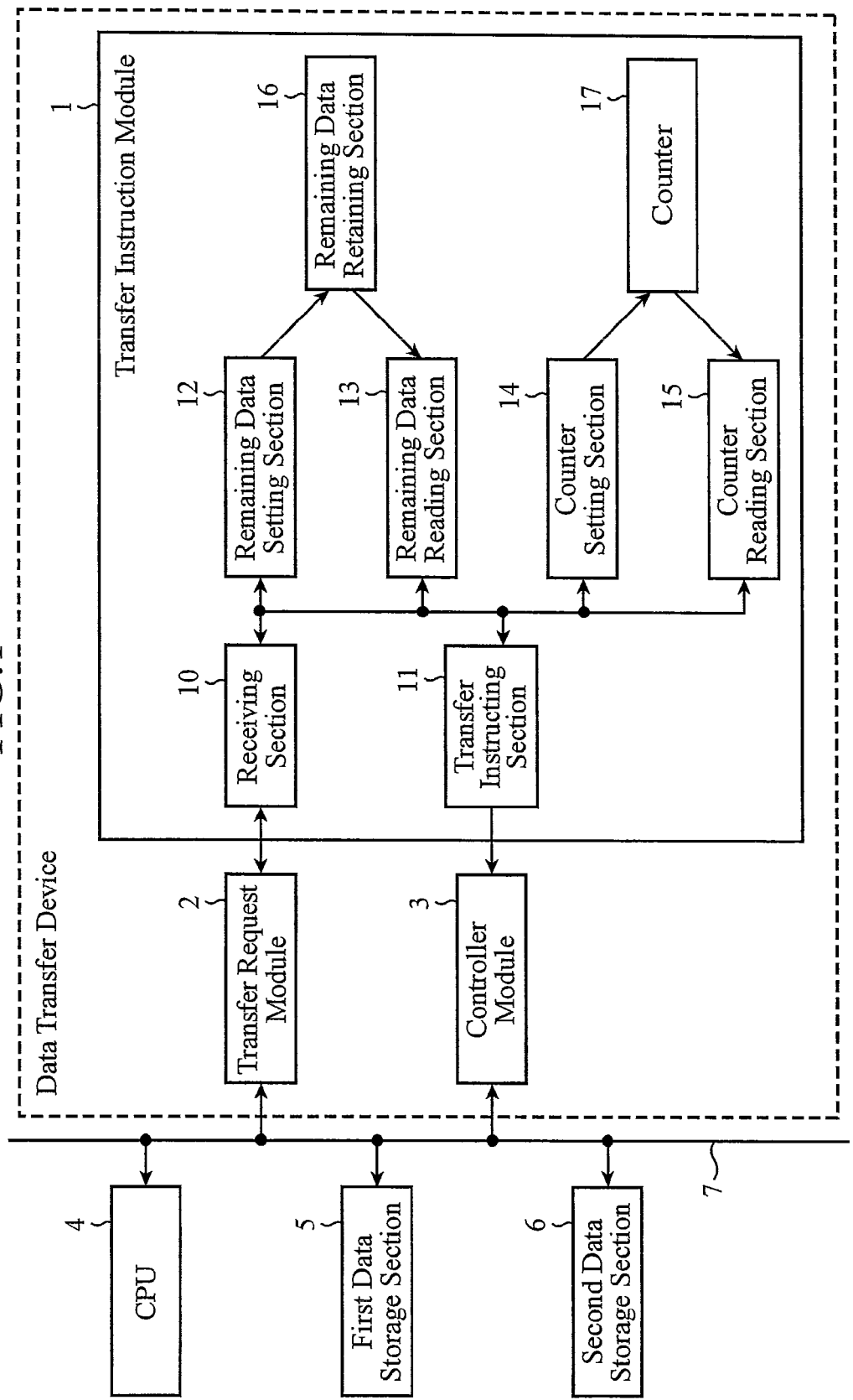
FIG. 1 is a block diagram showing a configuration of a data transfer system using a data transfer device of an embodiment 1.

FIG. 1 is a block diagram showing a configuration of a data transfer system using a data transfer device of an embodiment 1.

The data transfer system according to the embodiment 1 has a first data storage section 5 that stores data, a second data storage section 6 which is a transfer destination of the data stored in the first data storage section 5, a CPU 4 for requesting data transfer from the first data storage section 5 to the second data storage section 6, a transfer request module 2 for interpreting the data transfer request from the CPU 4, a transfer instruction module 1 for instructing data transfer in response to the interpretation of the transfer request module, and a controller module 3 for carrying out actual data transfer in accordance with the instructions from the transfer instruction module 1, in which the transfer request module 2, controller module 3, CPU 4, first data storage section 5, and second data storage section 6 are interconnected via a bus 7. Incidentally, the data transfer device is composed of the transfer instruction module 1, transfer request module 2, and controller module 3.

The transfer instruction module 1 includes a receiving section 10 for receiving the data transfer request after the interpretation by the transfer request module 2; a remaining data setting section 12 for setting a data volume to be transferred in accordance with the data transfer request after the interpretation the receiving section 10 receives; a remaining data retaining section 16 for holding the data volume set by the remaining data setting section 12; a remaining data reading section 13 for reading the data volume held in the remaining data retaining section 16 and for transmitting it to the CPU 4 via the receiving section 10; a counter setting section 14 for setting a limit of the number of times of the data transfer unit settings in accordance with the data transfer request after the interpretation the receiving section 10 receives; a counter 17 for holding the limit of the number of times of the settings set by the counter setting section 14 and for counting down its value (referred to as "counter value" from now on) every time the transfer unit is set; a counter reading section 15 for reading the counter value of the counter 17 and for transmitting it to the CPU 4 via the receiving section 10; and a transfer instruction section 11 for instructing the controller module 3 to carry out data transfer from the first data storage section 5 to the second data storage section 6 on the basis of the data transfer request after the interpretation the receiving section 10 receives. Incidentally, as for the limited number of times of the transfer units, it can be determined in advance or a configuration is possible which enables a user to set it via an operation section (not shown).

Next, the operation will be described.

Figure 2:
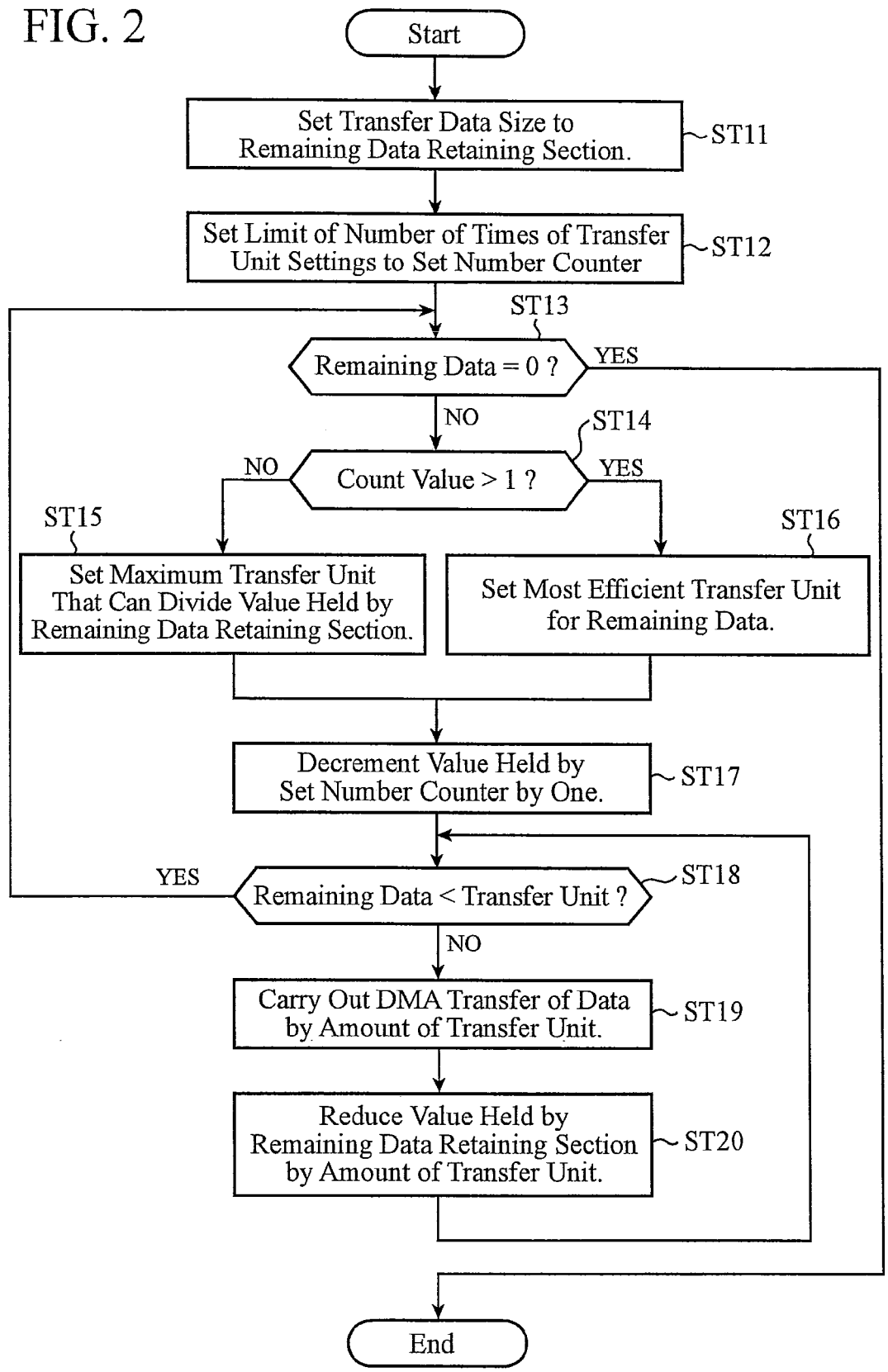
FIG. 2 is a flowchart showing the operation of the data transfer device of the embodiment 1.

FIG. 2 is a flowchart showing the operation of the data transfer device of the embodiment 1.

First, when the receiving section 10 receives the data transfer request transmitted from the CPU 4 via the transfer request module 2, the remaining data setting section 12 sets the data volume to be transferred contained in the data transfer request to the remaining data retaining section 16 (step ST11). Next, the counter setting section 14 sets the limit of the number of times of the transfer unit settings contained in the data transfer request to the counter 17 (step ST12).

Next, the CPU 4 makes a decision as to whether the data volume held in the remaining data retaining section 16 and read by the remaining data reading section 13 is zero or not (step ST13). If the data volume is zero, which means that the data to be transferred is zero, the data transfer device completes its operation. Unless the data volume is zero, the CPU 4 makes a decision as to whether the counter value which is held in the counter 17 and is read by the counter reading section 15 is greater than one or not (step ST14). If the counter value is one or less, the CPU 4 sets the maximum transfer unit that can divide the data volume the remaining data retaining section 16 holds (step ST15). If the counter value is greater than one, the CPU 4 sets the most efficient transfer unit corresponding to the data volume held in the remaining data retaining section 16, that is, the transfer unit with the value closest to the data volume (step ST16).

Next, the counter 17 decrements the counter value it retains by one (step ST17). Next, the CPU 4 makes a decision as to whether the data volume the remaining data retaining section 16 holds is equal to or greater than the transfer unit set at step ST15 or step ST16 (step ST18). If the data volume is equal to or greater than the transfer unit, the CPU 4 instructs, via the transfer request module 2, the transfer instruction section 11 to transfer the data in the transfer unit set. Then, according to the instruction from the CPU 4, the transfer instruction section 11 instructs the controller module 3 to transfer the data. According to the instruction from the transfer instruction section 11, the controller module 3 carries out DMA transfer of the data by the unit set (step ST19). Then, the remaining data setting section 12 changes the data volume held in the remaining data retaining section 16 to the value obtained by subtracting the amount of the data transferred (step ST20). If the data volume is less than the transfer unit at step ST18, the processing from step ST13 to step ST20 is repeated until the data volume held in the remaining data retaining section 16 becomes zero.

FIG. 3 is a table showing the operation of the data transfer device of the embodiment 1. It is assumed that the data transfer device of the embodiment 1 has five types of 1, 2, 4, 8 and 16 as the transfer units of the data volume to be transferred at a time, and that the width of the bus 7 can be set at 8, 16 and 32 bits. Accordingly, when the width of the bus 7 is set at 16 bits, for example, the volume of one data is 16 bits. Thus, if the transfer unit is set at 4, the data volume transferred at a time is 16 bits×4=64 bits. If the width of the bus 7 is set at 32 bits, the volume of one data is 32 bits, and if the transfer unit is 4, the data volume transferred at a time is 32 bits×4=128 bits.

The following is an explanation of the operation of the data transfer device of the embodiment 1 on the assumption that the data volume to be transferred is 39, and the number of times of the transfer unit settings is limited to three, first.

First, the data volume to be transferred and the limit of the number of times of transfer are set (step 1). Next, since the counter value is 3, the most efficient value 16 for the remaining data volume 39 is set as the data transfer unit, and the counter value is reduced to 2 (step 2). Next, the data transfer is carried out in the transfer unit 16 that has been set, and the data volume held in the remaining data retaining section 16 is reduced to 23 (step 3). Next, since the data volume is 23, the data transfer is carried out in the transfer unit 16 again, and the data volume is reduced to 7 (step 4).

Next, since the data volume, which is 7, is less than the transfer unit of 16, the transfer unit is set again. Since the counter value is 2, the most efficient value 4 for the remaining data volume 7 is set as the data transfer unit, and the counter value is reduced to 1 (step 5). Next, the data transfer is carried out in the transfer unit 4 that has been set, and the data volume is reduced to 3 (step 6). Next, since the data volume, which is 3, is less than the transfer unit of 4, the transfer unit is set again. Since the counter value is 1, the maximum number 1 that can divide the data volume is set as the data transfer unit, and the counter value is reduced to 0 (step 7). Next, the data transfer is carried out in the transfer unit 1 that has been set, and the data volume is reduced to 2 (step 8). Likewise, the remaining data transfer is carried out in the transfer unit 1, and the operation is completed at the time when the data volume is reduced to 0 (steps 9 and 10).

As described above, since the data transfer device of the embodiment 1 includes the transfer request module 2 for interpreting the data transfer request from the CPU 4, the transfer instruction module 1 for instructing the transfer unit of the data and the like in accordance with the interpretation of the transfer request module 2, and the controller module 3 for carrying out the data transfer in response to the instruction from the transfer instruction module 1, it can offer an advantage of being able to reduce the load of the CPU 4 by reducing the number of times of the transfer unit settings. In addition, since the transfer instruction module 1 includes the counter setting section 14, counter reading section 15, and counter 17, and is configured in such a manner as to be able to alter the number of times of the transfer unit settings, it can limit the number of times of the transfer unit settings at an appropriate value, thereby offering an advantage of being able to reduce the load of the CPU 4 and to increase the processing efficiency of the data transfer as a whole.

Embodiment 2

In the embodiment 1, the configuration is described which includes the counter setting section 14, counter reading section 15, and counter 17. In the present embodiment 2, the number of times of the transfer unit settings is fixed to two, and a configuration without the counter setting section 14, counter reading section 15, counter 17 will be described. Here, since the data transfer device of the embodiment 2 has the same configuration as the data transfer device of the embodiment 1 except that it does not have the counter setting section 14, counter reading section 15, and counter 17, description thereof will be omitted here.

Next, the operation will be described.

Figure 4:
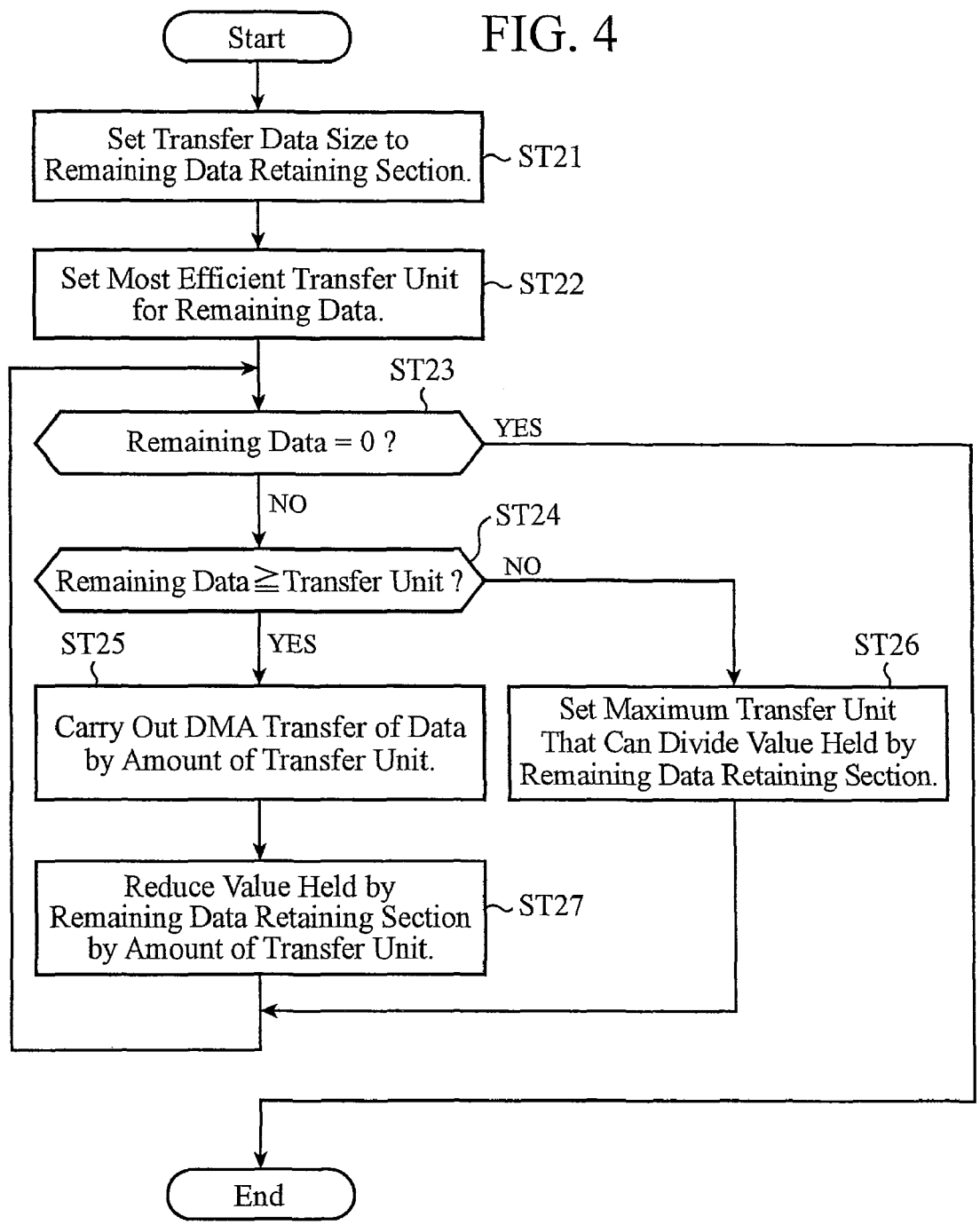
FIG. 4 is a flowchart showing the operation of a data transfer device of an embodiment 2.

FIG. 4 is a flowchart showing the operation of the data transfer device of the embodiment 2.

First, when the receiving section 10 receives the data transfer request transmitted from the CPU 4 via the transfer request module 2, the remaining data setting section 12 sets the data volume to be transferred contained in the data transfer request to the remaining data retaining section 16 (step ST21). Next, the CPU 4 sets the most efficient transfer unit corresponding to the data volume held in the remaining data retaining section 16, that is, the transfer unit with the value closest to the data volume (step ST22), and makes a decision as to whether the data volume which is held in the remaining data retaining section 16 and is read by the remaining data reading section 13 and is zero or not (step ST23).

If the data volume is zero at step ST23, since there is no data to be transferred, the data transfer device completes its operation. Unless the data volume is zero, the CPU 4 makes a decision as to whether the data volume held in the remaining data retaining section 16 is equal to or greater than the transfer unit set at step ST22 (step ST24). If the data volume is equal to or greater than the transfer unit, the CPU 4 instructs, via the transfer request module 2, the transfer instruction section 11 to transfer the data in the transfer unit that has been set at step 22. Then, according to the instruction from the CPU 4, the transfer instruction section 11 instructs the controller module 3 to transfer the data. When the controller module 3 carries out, according to the instruction from the transfer instruction section 11, DMA transfer of the data by the amount of the unit that has been set (step ST25), the remaining data setting section 12 changes the data volume held in the remaining data retaining section 16 to the value obtained by subtracting the amount of the data transferred (step ST27). If the data volume is less than the transfer unit at step ST24, the CPU 4 sets the maximum transfer unit that can divide the data volume the remaining data retaining section 16 holds (step ST26), and repeats the processing from step ST23 to step ST27 until the data volume held in the remaining data retaining section 16 becomes zero at step ST23.

As described above, since the data transfer device of the embodiment 2 fixes the number of times of the transfer unit settings at two, it can obviate the counter setting section 14, counter reading section 15, and counter 17, and offers an advantage of being able to simplify the configuration of the data transfer device. In addition, since it obviates the necessity of performing the setting processing of the transfer unit in accordance with the counter value of the counter 17 as at step ST14 of FIG. 2, it offers an advantage of being able to further reduce the load of the CPU 4 at the time of data transfer.

Incidentally, although the embodiments 1 and 2 are configured in such a manner as to transfer data from the first data storage section 5 to the second data storage section 6, it goes without saying that the data can be transferred from the second data storage section 6 to the first data storage section 5, or a configuration is also possible which includes a plurality of data storage sections.

In addition, as for the transfer unit of the data volume, it is not limited to the five types of 1, 2, 4, 8 and 16, but 32 or 64 can also be used.

INDUSTRIAL APPLICABILITY

As described above, the data transfer device and data transfer method in accordance with the present invention are configured in such a manner as to be able to reduce the load of the CPU by limiting the number of times of the transfer unit settings, and can alter the number of times of the transfer unit settings. Accordingly, they can limit the number of times of the transfer unit settings to an appropriate value and improve the processing efficiency of the data transfer as a whole. Thus, they are suitable for the data transfer system that carries out data transfer between peripheral equipment and a memory device using a DMA method.

What is claimed is:

1. A data transfer device comprising:
a transfer request module for interpreting a data transfer request received from outside;
a transfer instruction module including a receiving section for receiving the data transfer request after interpretation by the transfer request module, a remaining data setting section for setting a data volume to be transferred in accordance with the data transfer request after the interpretation the receiving section receives, a remaining data retaining section for holding the data volume set by the remaining data setting section, a remaining data reading section for reading the data volume held in the remaining data retaining section, a counter setting section for setting a limit of a number of times of transfer unit settings in accordance with the data transfer request after the interpretation the receiving section receives, a counter for holding the limit of the number of times of settings carried out by the counter setting section and for counting down the value it holds every time the transfer unit is set, a counter reading section for reading the value held in the counter, and a transfer instruction section for instructing a controller module to transfer data in response to the data transfer request after the interpretation which is transmitted via the receiving section; and
the controller module for transferring the data in accordance with the instruction from the transfer instruction section.

2. A data transfer method comprising:
a first step of receiving a data transfer request transmitted from outside, and of setting a data volume contained in the data transfer request to a remaining data retaining section;
a second step of setting a limit of a number of times of data transfer unit settings in accordance with the data transfer request;
a third step of holding the limit of the number of times of the settings set at the second step in a counter, and of counting down a value of the counter every time the data transfer unit is set;
a fourth step of making a decision as to whether the data volume the remaining data retaining section holds is zero or not;
a fifth step of making a decision as to whether the value of the counter set at the third step is greater than one or not;
a sixth step of setting the data transfer unit closest to the data volume the remaining data retaining section holds when the data volume the remaining data retaining section holds is not zero and when the value of the counter set at the third step is greater than one, and of setting a maximum data transfer unit that can divide the data volume the remaining data retaining section holds when the data volume the remaining data retaining section holds is not zero and when the value of the counter set at the third step is equal to or less than one;
a seventh step of transferring the data according to the data transfer unit that has been set until the data volume held in the remaining data retaining section becomes less than the data transfer unit set at the sixth step; and
an eighth step of subtracting an amount of data transferred from the data volume held in the remaining data retaining section, wherein
steps from the third step to the eighth step are repeated until the data volume in the remaining data retaining section is reduced to zero.

* * * * *